(12) United States Patent
Egawa

(10) Patent No.: US 6,836,618 B2
(45) Date of Patent: Dec. 28, 2004

(54) DISTANCE MEASURING DEVICE

(75) Inventor: Akira Egawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/767,828

(22) Filed: Jan. 24, 2001

(65) Prior Publication Data

US 2001/0017981 A1 Aug. 30, 2001

(30) Foreign Application Priority Data

Jan. 31, 2000 (JP) ........................................ 2000-021072

(51) Int. Cl.[7] .......................... G03B 13/34; G03B 3/10; G03B 15/02
(52) U.S. Cl. ...................... 396/104; 396/106; 396/122; 396/123
(58) Field of Search .......................... 396/89, 120, 121, 396/122, 123, 104, 106

(56) References Cited

U.S. PATENT DOCUMENTS

| | | | |
|---|---|---|---|
| 4,238,153 A | * 12/1980 | Imura | .......................... 396/103 |
| 4,575,211 A | 3/1986 | Matsumura et al. | ........ 396/123 |
| 4,943,824 A | * 7/1990 | Nabeshima et al. | .......... 396/50 |
| 5,249,011 A | 9/1993 | Sakai | .......................... 396/122 |
| 5,264,892 A | * 11/1993 | Nonaka et al. | ............. 396/104 |
| 5,313,245 A | * 5/1994 | Konishi | ....................... 396/109 |
| 5,552,853 A | * 9/1996 | Muramatsu et al. | ........ 396/121 |
| 5,589,911 A | * 12/1996 | Nonaka | ....................... 396/80 |

FOREIGN PATENT DOCUMENTS

| | | |
|---|---|---|
| JP | 59-193307 | 11/1984 |
| JP | 63-163830 | 7/1988 |
| JP | 6-331883 | 12/1994 |

* cited by examiner

Primary Examiner—Russell Adams
Assistant Examiner—Rochelle Blackman
(74) Attorney, Agent, or Firm—Fitzpatrick, Cella, Harper & Scinto

(57) ABSTRACT

In a distance-measuring device that measures individual distances to plural distance-measured regions, a selection circuit selects at least one first measured distance value by excluding second measured distance values that are not smaller than a predetermined distance value from the individually measured distance values to the plural distance measured regions. An auto-focusing data value is computed in accordance with the selected first measured distance values.

21 Claims, 2 Drawing Sheets

DISTANCE MEASURING DEVICE

BACKGROUND OF THE INVENTION

1. Field of the Invention

The present invention relates to a distance-measuring device for independently measuring distances to a plurality of distance-measured points, and to the improvement of a camera.

2. Description of the Related Art

Hitherto, various multipoint-distance-measuring devices have been proposed. A device is disclosed in, for example, Japanese Patent Laid-Open No. 6-331883, in which a plurality of distance-measured points are classified into groups in accordance with the position of and the distance to the distance-measured points, and the mean value of distances to the distance-measured points in each group is calculated. Another device is disclosed in, for example, Japanese Patent Laid-Open No. 59-193307, in which a smallest measured-distance to be used as focus adjustment data is selected among the mean value of distances to a plurality of visual fields, a distance value to a central visual-field, and distance values to the plurality of visual fields. Another device is disclosed in, for example, Japanese Patent Laid-Open No. 63-163830, in which a weighted average value is calculated.

However, in the known distance measuring devices, when the distance-measured points in all the visual fields are classified into groups and the mean values of the measured distances are calculated, a release time lag is produced due to an elongated calculation time. When using a mean value of distances, sharp focus cannot be obtained while generally intending to focus at one point in a visual field. In a device in which priority is given to a short distance range, the shutter cannot be released when even one of the distance-measured points is disposed at a shorter distance than a shortest permissible distance. Sometimes, a better photograph can be taken when the camera does not focus on an object disposed at the shortest distance because the object in the short distance range also has a certain depth.

SUMMARY OF THE INVENTION

Accordingly, it is an object of the present invention to provide a distance-measuring device in which distances to a plurality of distance-measured points are individually measurable.

It is another object of the present invention to provide a camera using a distance-measuring device in which the distances to a plurality of distance-measured points are individually measurable.

To these ends, according to an aspect of the present invention, a distance-measuring device for measuring individual distances to a plurality of distance-measured regions includes a selection circuit for selecting at least one first measured distance-value by excluding at least one second measured distance-value, the second measured distance-value being not smaller than a predetermined distance value, from individually measured distance-values to the plurality of distance-measured regions; and a computation circuit for computing an auto-focusing data value in accordance with the measured distance-value selected by the selection circuit.

According to another aspect of the present invention, a camera including a distance-measuring device for measuring individual distances to a plurality of distance-measured regions includes a selection circuit for selecting at least one first measured distance-value by excluding at least one second measured distance-value, the second measured distance-value being not smaller than a predetermined distance value, from individually measured distance-values to the plurality of distance-measured regions; a computation circuit for computing an auto-focusing data value in accordance with the measured distance-value selected by the selection circuit; and a driving circuit for driving an image-forming lens in accordance with the auto-focusing data value computed by the computation circuit.

Further objects, features and advantages of the present invention will become apparent from the following description of the preferred embodiments with reference to the attached drawings.

DESCRIPTION OF THE PREFERRED EMBODIMENTS

Figure 1:
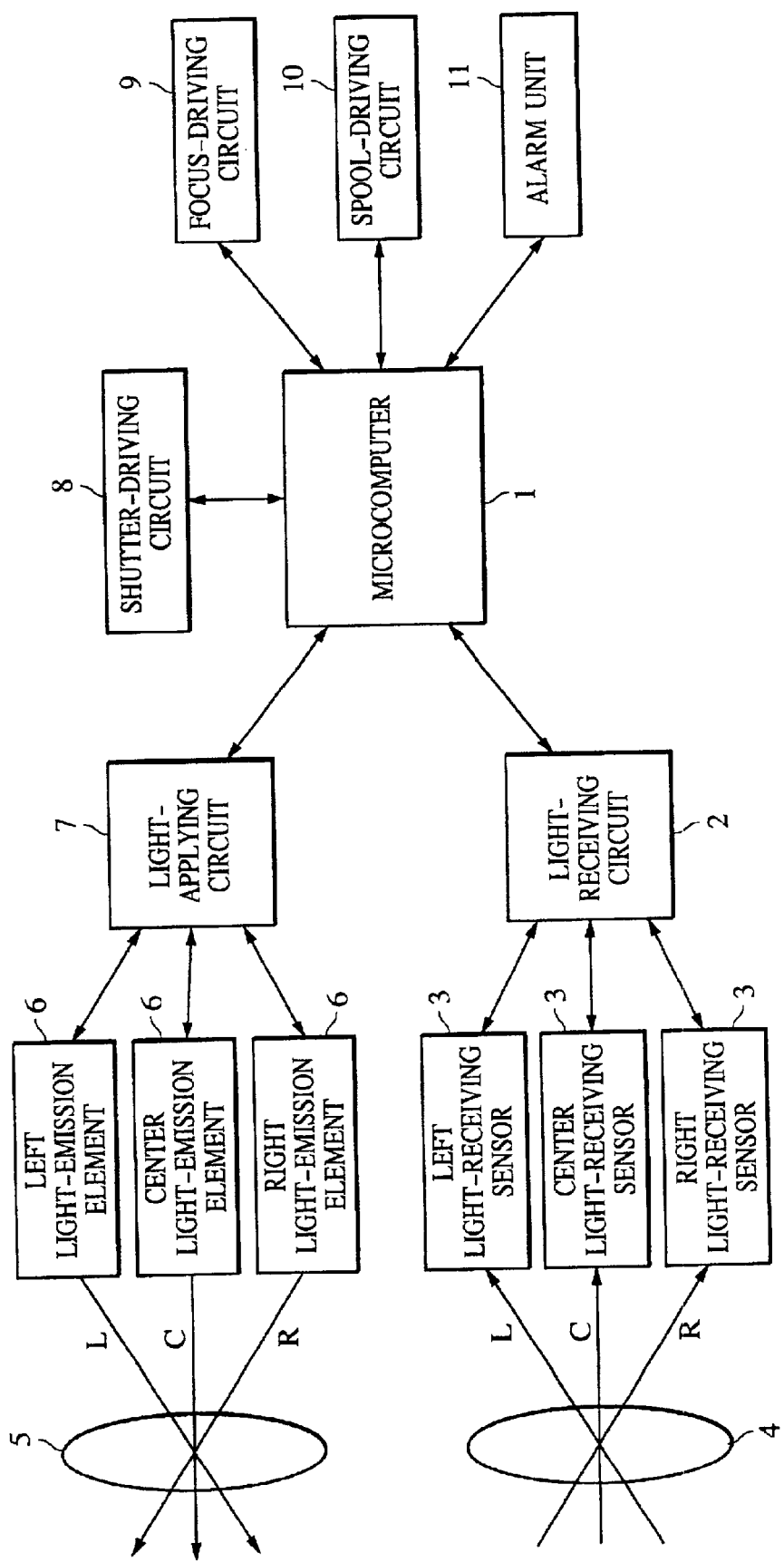
FIG. 1 is a block diagram of a circuit arrangement used in a camera according to an embodiment of the present invention.

FIG. 1 is a block diagram of a critical portion of a circuit arrangement used in a camera according to an embodiment of the present invention. In FIG. 1, a microcomputer 1 controls the camera. A light-receiving circuit 2 processes a signal received from a light-receiving sensor unit 3 and outputs the processed signal to the microcomputer 1. The light-receiving sensor unit 3 includes sensors L, C, and R which are used for measuring distances to objects corresponding to points (visual fields) disposed in an image plane to the left, at a center, and to the right, respectively. In FIG. 1, a light-receiving lens 4 is shown. A light-applying lens 5 applies light to an object to which the distance is measured. A light-emission unit 6 includes three light-emission elements L, C, and R, which are used for measuring distances to the objects corresponding to the points disposed in the image plane to the left, at a center, and to the right, respectively. A light-applying circuit 7 drives the light-emission elements.

A distance-measuring device is formed with these components including the light-receiving circuit 2 and the light-applying circuit 7.

A shutter-driving circuit 8 controls a shutter (not shown) of a camera for exposing a film. A focus-driving circuit 9 drives a lens (not shown) of the camera so as to focus on an object in accordance with the distance data obtained from the distance-measuring device. A spool-driving circuit 10 rolls up and unrolls a film (not shown). An alarm unit 11 produces a short-distance alarm and the like to the user by a sound or light.

Figure 2:
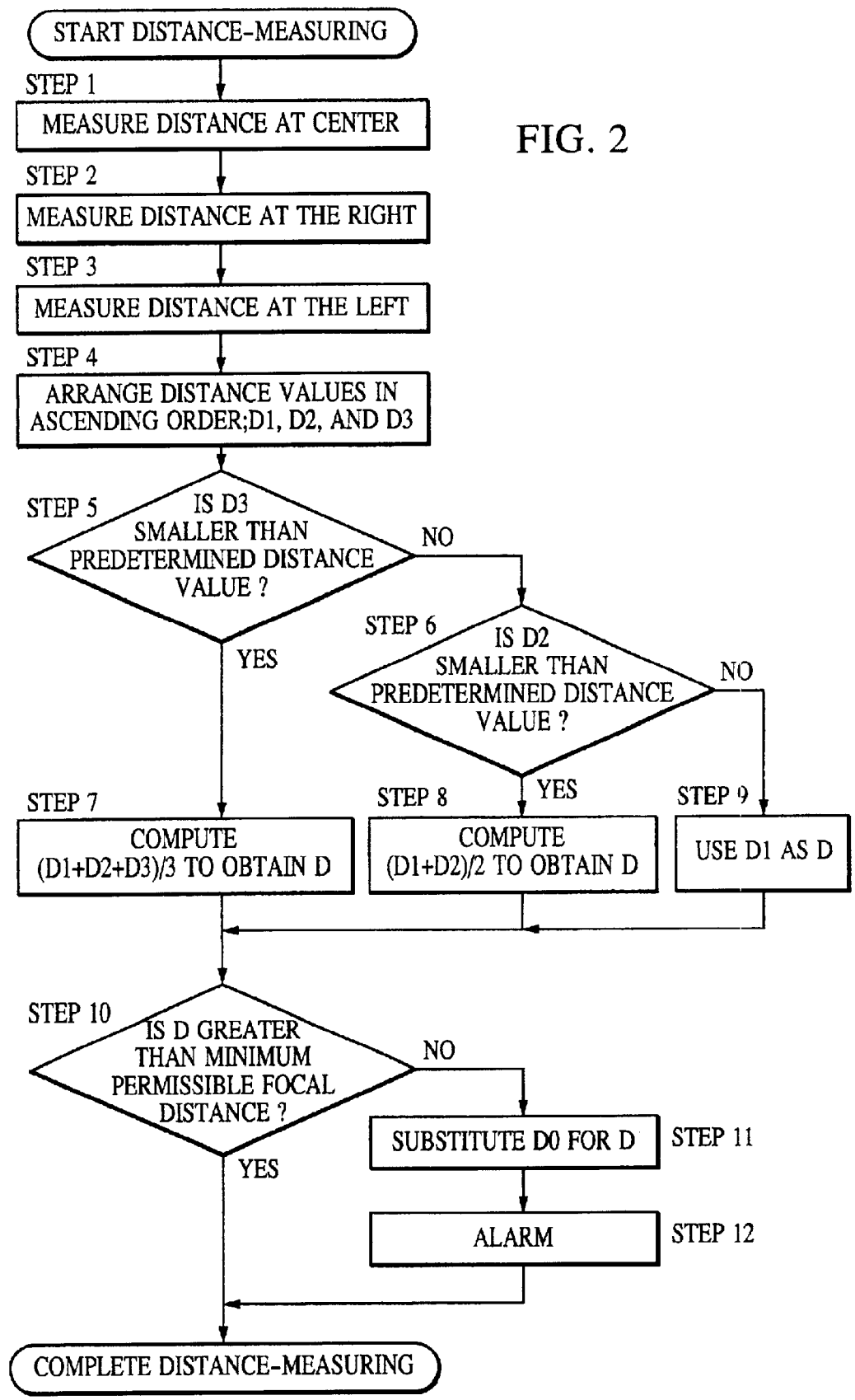
FIG. 2 is a flowchart showing a distance measuring operation of the camera according to the embodiment of the present invention shown in FIG. 1.

FIG. 2 is a flowchart showing the operation of the camera.

In steps 1 to 3, the microcomputer 1 drives the light-applying circuit 7, the light-emission unit 6, the light-receiving sensor unit 3, and the light-receiving circuit 2, whereby the distances to points disposed at a center, to the right, and to the left in an image plane are measured in steps 1, 2, and 3, respectively, and the process proceeds to step 4. In step 4, the microcomputer 1 arranges the distances measured in steps 1 to 3 in an ascending order, that is, in order of measured distance values D1, D2, and D3 in which D1 represents the smallest value and D3 represents the largest value.

In step 5, the microcomputer 1 determines whether or not the measured distance value D3, which is the greatest among the three measured distance values, is smaller than a predetermined distance value. When D3 is smaller, the process proceeds to step 7. In this case, in which the three points are disposed at distances shorter than the predetermined distance, the microcomputer 1 computes a value (D1+D2+D3)/3, in step 7, by considering a depth of field and the like. A distance value D obtained by the computation serves as a distance value for focusing (as data for auto-focusing). The process proceeds to step 10.

When the measured distance value D3 is not smaller than the predetermined distance value, the process proceeds to step 6. In step 6, the microcomputer 1 determines whether or not the measured distance value D2 is smaller than the predetermined distance value. When it is smaller, the process proceeds to step 8. In this case, in which two points are disposed at the distances D1 and D2 which are smaller than the predetermined distance, the microcomputer 1 computes the value (D1+D2)/2 by neglecting the measured distance value D3. Another distance value D obtained by the computation serves as a distance value for focusing. The process then proceeds to step 10. When the distance value D2 is not smaller than the predetermined distance value, the process proceeds to step 9. In step 9, the microcomputer 1 uses the measured distance value D1, as another distance value D to serve for focusing on an object disposed in a short-distance range to which a focusing priority is given, by neglecting the measured distance values D2 and D3 which are not smaller than the predetermined distance value. Then, the process proceeds to step 10.

In step 10, it is determined whether or not the distance value D obtained either in step 7, 8, or 9 is greater than a minimum focal distance permissible for the focus-driving circuit 9 to perform auto-focusing. When D is greater in step 10, a distance-measuring operation is completed.

When the distance value D is smaller than the minimum focal distance permitting auto-focusing in step 10, the process proceeds to step 11, and a minimum permissible focal distance D0 is substituted for the distance value D. Then, the process proceeds to step 12 in which an alarm is switched on by using the alarm unit 11 and the distance-measuring operation is completed.

When a number of points disposed in a given range have the same distance from the camera, the distance to these points may be used instead of the mean values obtained in consideration of a depth of field in steps 7 and 8.

Although three points are used as the distance-measured points in the above embodiment, five points or seven points may be used as the distance-measured points, in which the same effect can be obtained.

According to the embodiment, the distance value D for auto-focusing is obtained from a plurality of distance values measured to a plurality of distance-measured points when the plurality of distance-measured points are disposed in a predetermined distance range toward the shorter distance side (in steps 7 and 8). Therefore, proper focusing can be performed quickly, without releasing time lags, on an object, for example, a flower arrangement disposed in the vicinity of the minimum permissible focal distance.

The minimum permissible focal distance for auto-focusing is included in the predetermined distance range toward the shorter distance side, whereby focusing can be performed by considering the depth of the object disposed at the shorter distance side and without an alarm when focusing is properly performed on a major part of the object even when certain distance-measured points are disposed at a distance shorter than the minimum permissible focal distance (in steps 7, 8, 9, and 10).

Focusing can be properly performed by using a plurality of measured distance values of the distance-measured points disposed at a shorter distance side, in a manner such that a mean value of depths of field corresponding to the plurality of measured distances and a majority of the plurality of measured distance-values are selectively used.

The predetermined distance range at the shorter distance side can be properly set by using distance ranges obtained from a focal distance or an aperture value of the camera.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A distance-measuring device for individually measuring a plurality of distance-values corresponding to a respective plurality of distance-measured regions, the plurality of distance-measured regions constituting all distance-measurable regions of the distance-measuring device, the distance-measuring device comprising:

a selection circuit for selecting at least one first measured distance-value from the plurality of distance-values, wherein the selection is effected such that in the case that more than one of the plurality of distance-values have been determined to be greater than or equal to a predetermined distance-value, the distance-values that have been determined to be greater than or equal to the predetermined distance-value are excluded, and other distance-values of the plurality of distance-values that have not been determined to be greater than or equal to the predetermined distance-value are not excluded; and a computation circuit for computing an auto-focusing data value in accordance with the at least one first measured distance-value selected by said selection circuit.

2. A distance-measuring device according to claim 1, wherein said computation circuit sets the auto-focusing data value to a value equal to a minimum permissible distance-value in response to a determination that the computed auto-focusing data value is smaller than the minimum permissible distance-value.

3. A distance-measuring device according to claim 1, wherein said computation circuit computes the auto-focusing data value from a mean value of the at least one first measured distance-value selected by said selection circuit.

4. A distance-measuring device according to claim 1, wherein said computation circuit computes the auto-focusing data value from a majority of the at least one first measured distance-value selected by said selection circuit.

5. A distance-measuring device according to claim 1, wherein the predetermined distance-value is obtained from a focal distance of a lens used for auto-focusing.

6. A distance-measuring device according to claim 1, wherein the predetermined distance-value is obtained from an aperture value of a lens used for auto-focusing.

7. A distance-measuring device according to claim 1, wherein a smallest measured distance-value serves as the auto-focusing data value when all of the plurality of distance-values have been determined to be greater than or equal to the predetermined distance-value and are not selected by the selection circuit.

8. A camera including a distance-measuring device for individually measuring a plurality of distance-values corresponding to a respective plurality of distance-measured regions, the plurality of distance-measured regions constituting all distance-measurable regions of the distance-measuring device, and camera comprising:

a selection circuit for selecting at least one first measured distance-value from the plurality of distance-values, wherein the selection is effected such that in the case that more than one of the plurality of distance-values have been determined to be greater than or equal to a predetermined distance-value, the distance-values that have been determined to be greater than or equal to the predetermined distance-value are excluded, and other distance-values of the plurality of distance-values that have not been determined to be greater than or equal to the predetermined distance-value are not excluded;

a computation circuit for computing an auto-focusing data value in accordance with the at least one first measured distance-value selected by said selection circuit; and a driving circuit for driving an image-forming lens in accordance with the auto-focusing data value computed by the computation circuit.

9. A camera according to claim 8, wherein said computation circuit sets the auto-focusing data value to a value equal to a minimum permissible distance-value in response to a determination that the computed auto-focusing data value is smaller than the minimum permissible distance-value.

10. A method of individually measuring a plurality of distance-values corresponding to a respective plurality of distance-measured regions by a distance-measuring device, the plurality of distance-measured regions constituting all distance-measurable regions of the distance-measuring device, said method comprising the steps of:

selecting at least one first measured distance-value from the plurality of distance-values, wherein the selection is effected such that in the case that more than one of the plurality of distance-values have been determined to be greater than or equal to a predetermined distance-value, the distance-values that have been determined to be greater than or equal to the predetermined distance-value are excluded, and other distance-values of the plurality of distance-values that have not been determined to be greater than or equal to the predetermined distance-value are not excluded; and computing an auto-focusing data value in accordance with the selected at least one first measured distance-value.

11. A measuring method according to claim 10, wherein said computing step includes setting the auto-focusing data value to a value equal to a minimum permissible distance-value in response to a determination that the computed auto-focusing data value is smaller than the minimum permissible distance-value.

12. A measuring method according to claim 10, wherein said computing step includes computing the auto-focusing data value from a mean value of the selected at least one first measured distance-value.

13. A measuring method according to claim 10, wherein said computing step includes computing the auto-focusing data value from a majority or the selected at least one first measured distance-value.

14. A computer usable medium for use with a distance-measuring device for individually measuring a plurality of distance-values corresponding to a respective plurality of distance-measured regions, the plurality of distance-measured regions constituting all distance-measurable regions of the distance-measuring device, said computer usable medium having computer readable program code units embodied therein comprising:

a first program code unit for selecting at least one first measured distance-value from the plurality of distance-values, wherein the selection is effected such that in the case that more than one of the plurality of distance-values have been determined to be greater than or equal to a predetermined distance-value, the distance-values that have been determined to be greater than or equal to the predetermined distance-value are excluded, and other distance-values of the plurality of distance-values that have not been determined to be greater than or equal to the predetermined distance-value are not excluded; and a second program code unit for computing an auto-focusing data value in accordance with the selected at least one first measured distance-value.

15. A computer usable medium according to claim 14, wherein the second program code unit includes a program code unit for setting the auto-focusing data value to a value equal to a minimum permissible distance-value in response to a determination that the computed auto-focusing data value is smaller than the minimum permissible distance-value.

16. A distance-measuring device for individually measuring a plurality of distance-values corresponding to a respective plurality of distance-measured regions, the plurality of distance-measured regions constituting all distance-measurable regions of the distance-measuring device, the distance-measuring device comprising:

a selection circuit for selecting at least one measured distance-value for use in focusing, wherein the selection is effected by comparing a first measured distance-value of the plurality of distance-values to a predetermined distance-value, and wherein if the first measured distance-value is greater than or equal to the predetermined distance-value, said selection circuit compares a second measured distance-value of the plurality of distance-values to the predetermined distance-value and excludes the first measured distance-value from being selected; and a computation circuit for computing an auto-focusing data value in accordance with the at least one measured distance-value selected by said selection circuit, wherein if the second measured distance-value is greater than or equal to the predetermined distance-value, said selection circuit excludes the second measured distance-value from being selected, and wherein said selection circuit compares measured distance values in descending order to the predetermined distance-value.

17. A distance-measuring device according to claim 16, further comprising an ordering circuit for ordering into a predetermined order the plurality of distance-values before said selection circuit performs the selection.

18. A distance-measuring device according to claim 16, wherein said computation circuit sets the auto-focusing data value to a value equal to a minimum permissible distance-value when the computed auto-focusing data value is smaller than the minimum permissible distance-value.

19. A distance-measuring device according to claim 1, further comprising an ordering circuit for ordering into a predetermined order the plurality of distance-values, wherein said selection circuit performs the selection and exclusion upon the ordered plurality of distance-values in accordance with the predetermined order.

20. A distance-measuring device for individually measuring a plurality of distance-values corresponding to a respective plurality of distance-measured regions, the plurality of distance-measured regions constituting all distance-measurable regions of the distance-measuring device, the distance-measuring device comprising:

a selection circuit which selects, from the plurality of distance-values, at least one measured distance-value, not less than the shortest distance-value where focusing operation is possible and not more than a predetermined distance-value, without taking into account the position in the image plane of the plurality of distance-measured regions; and a computation circuit for computing an auto-focusing data value in accordance with the at least one measured distance-value selected by said selection circuit.

21. A distance-measuring device according to claim 20, wherein when said selection circuit selects a plurality of distance-values, and said computation circuit performs the computation of the auto-focusing data value as the average of the plurality of selected distance-values.

* * * * *